United States Patent
Monroe

(10) Patent No.: US 6,524,472 B2
(45) Date of Patent: Feb. 25, 2003

(54) MONOLITHICALLY-MOLDED SUBASSEMBLIES FOR RETROFITTING EXISTING RO SYSTEMS TO ZERO WASTE

(75) Inventor: Jerry Monroe, Peoria, AZ (US)

(73) Assignee: Watts Regulator Co., North Andover, MA (US)

( * ) Notice: Subject to any disclaimer, the term of this patent is extended or adjusted under 35 U.S.C. 154(b) by 0 days.

(21) Appl. No.: 09/804,706

(22) Filed: Mar. 12, 2001

(65) Prior Publication Data

US 2002/0189985 A1 Dec. 19, 2002

(51) Int. Cl.⁷ ............................................. B01D 61/10
(52) U.S. Cl. .......................... 210/90; 210/97; 210/232; 210/321.6; 137/798; 137/315.01
(58) Field of Search ...................... 210/90, 97, 136, 210/137, 195.2, 232, 239, 240, 321.6, 321.65, 251, 257.2, 258; 285/125.1; 137/798, 315.01

(56) References Cited

U.S. PATENT DOCUMENTS

| | | |
|---|---|---|
| 3,207,282 A | 9/1965 | Norris |
| 3,550,782 A | 12/1970 | Veloz |
| 3,630,378 A | 12/1971 | Bauman |
| 3,726,793 A | 4/1973 | Bray |
| 3,746,640 A | 7/1973 | Bray |
| 3,786,924 A | 1/1974 | Huffman |
| 3,849,305 A | 11/1974 | Manjikian |
| 3,856,676 A | 12/1974 | Grimme, Jr. et al. |
| 4,156,621 A | 5/1979 | Andrews et al. |
| 4,160,727 A | 7/1979 | Harris, Jr. |
| 4,321,137 A | 3/1982 | Kohler |
| 4,332,685 A | 6/1982 | Nowlin et al. |
| 4,344,826 A | 8/1982 | Smith |
| 4,610,605 A | 9/1986 | Hartley |
| 4,626,346 A | 12/1986 | Hall |
| 4,670,144 A | 6/1987 | McCausland et al. |
| 4,702,842 A | 10/1987 | Lapierre |
| 4,801,375 A | 1/1989 | Padilla |
| 4,808,287 A | 2/1989 | Hark |
| 4,812,237 A | 3/1989 | Cawley et al. |
| 4,842,724 A | 6/1989 | Bray et al. |
| 5,006,234 A | 4/1991 | Menon et al. |
| 5,039,402 A | 8/1991 | Himelstein |
| 5,043,066 A | 8/1991 | Miller et al. |
| 5,064,097 A | 11/1991 | Brog et al. |
| 5,069,782 A | 12/1991 | Moyher, Jr. et al. |
| 5,089,144 A | 2/1992 | Ozkahyaoglu et al. |
| 5,112,477 A | 5/1992 | Hamlin |
| 5,122,265 A | 6/1992 | Mora et al. |
| 5,203,803 A | 4/1993 | Schoenmeyr |
| 5,256,279 A | 10/1993 | Voznick et al. |
| 5,282,972 A | 2/1994 | Hanna et al. |
| 5,445,729 A | 8/1995 | Monroe et al. |
| 5,484,538 A | 1/1996 | Woodward |
| RE35,252 E  * | 5/1996 | Clack et al. |
| 5,573,142 A | 11/1996 | Morellato et al. |
| 5,582,717 A | 12/1996 | DiSanto |
| 5,639,374 A | 6/1997 | Monroe et al. |
| 5,766,453 A | 6/1998 | Morellato et al. |
| 5,879,558 A | 3/1999 | Monroe et al. |
| 5,928,503 A | 7/1999 | Shang-Chun |
| 5,976,363 A | 11/1999 | Monroe et al. |
| 5,997,738 A | 12/1999 | Lin |
| 6,103,125 A | 8/2000 | Kuepper |
| 6,319,399 B1 * | 11/2001 | Peterson et al. |

* cited by examiner

Primary Examiner—Joseph W. Drodge
Assistant Examiner—Terry K. Cecil
(74) Attorney, Agent, or Firm—Fish & Richardson P.C.

(57) ABSTRACT

Monolithically-molded subassemblies (1, 2, 3) are used to retrofit existing reverse osmosis systems into zero waste RO systems. The subassemblies reduce the number of connections necessary such that the retrofitting may be accomplished by unskilled labor. The subassemblies may be integrally packaged together on a backboard 45 and are placed in-line in the inlet to the RO unit and in each of the outlets from the RO unit. For example, the first subassembly 1 (FIG. 9) includes an input port 10 for connecting to source of water to be purified, an first portal 103 communicating with a pressure switch, a second portal 102 communicating with a pressure gauge and an output port 12 communicating with the RO unit inlet. Using the subassemblies, the retrofit most typically requires only six connections thereby simplifying system installation, improving system reliability, and extending system longevity.

6 Claims, 12 Drawing Sheets

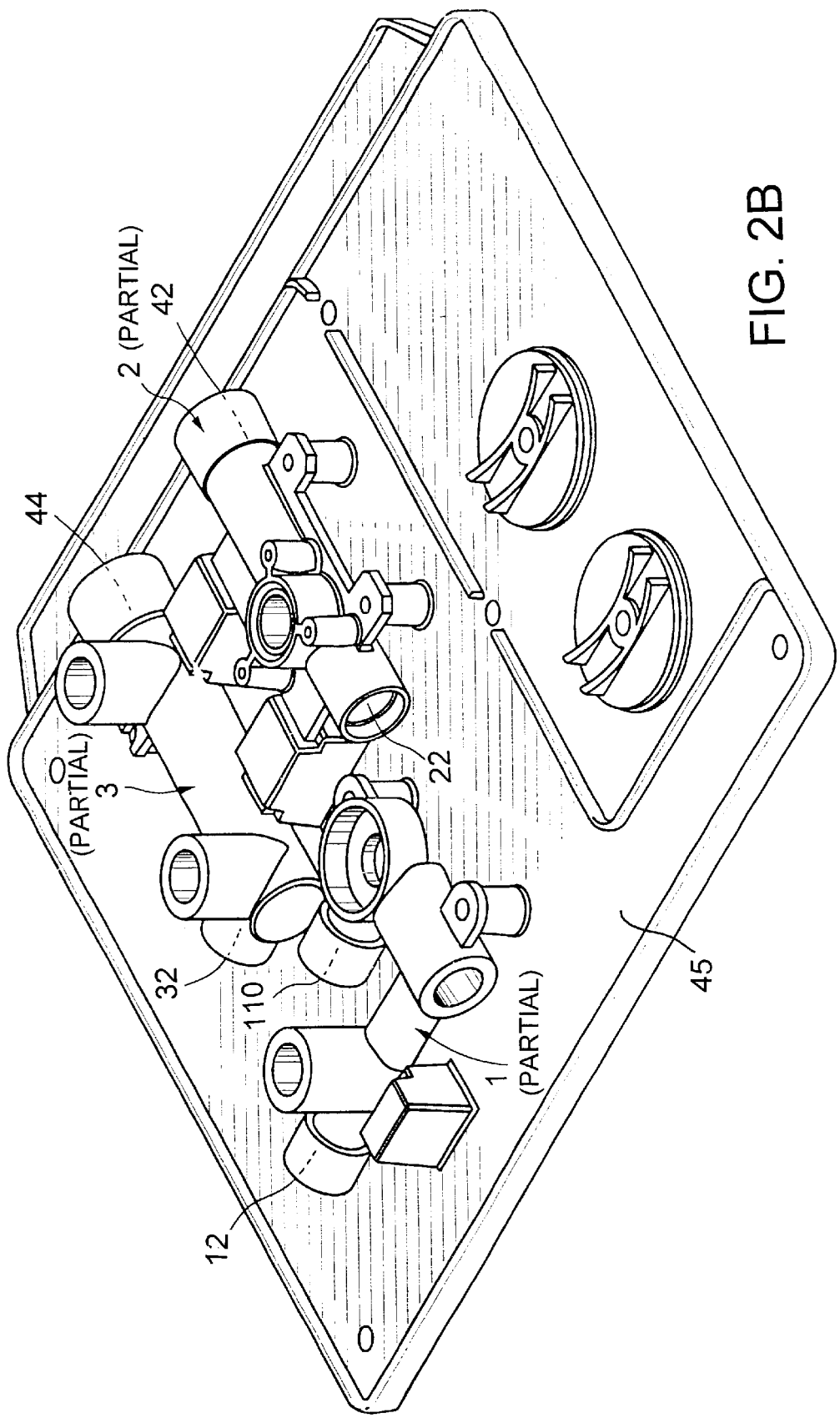

MONOLITHICALLY-MOLDED SUBASSEMBLIES FOR RETROFITTING EXISTING RO SYSTEMS TO ZERO WASTE

BACKGROUND OF THE INVENTION

1. Field of the Invention

The present invention generally concerns reverse osmosis (RO) systems, and zero-waste RO systems.

The present invention particularly concerns monolithic plumbed sub-assemblies and assemblies used in (i) retrofitting diverse existing non-zero-waste RO systems to become zero waste RO systems, and in (ii) constructing new, modular, zero-waste RO systems.

2. Description of the Prior Art 2.1 General Requirement to Abate Water Wastage Attendant Upon RO Conventional systems for purifying water by process of reverse osmosis (RO) produce, in addition to purified water, a considerable amount of waste water. This waste water, which is a by-product of the RO process, is also called concentrate water or reject water. It is typically put down the drain of the residence or business in which the RO system is installed. Although called "waste", the waste water is in no way contaminated or unsafe. It simply contains a somewhat higher proportion of the elements—mostly minerals—removed from the supply water by the RO process than does the supply water itself. This additional concentration is, of course, resultant from the addition to the waste water of those elements that were previously present in the purified water.

This waste water is of increasing concern, particularly in increasing widespread areas of the world where water is scarce, and even a precious commodity. It is economically inefficient to pump water to distances ranging to thousands of miles, as in the American west, only to put it down the drain. For example, the ratio of concentrate or reject water to purified water can range from about 3:1 to about 15:1 depending on the particular system. This means that for every gallon of purified water produced, from 3 to 15 gallons is considered as concentrate water and is customarily sent to a drain.

It should be understood that recognition of, and concern over, this wastage is not limited to just the inventor of the present application (and a related patent), and to the inventors of still other related patents. Improvements in RO systems have already been made. RO systems sold in the United States up until about 1991 did not necessarily incorporate a shut-off switch—shutting off the flow of water when the tank reservoir of purified water became full, and preventing a RO system from constantly dripping water—until 1991 when the State of California mandated this wastage-abating feature for all RO systems sold within that state.

Legislatures in several states of the American West now seem poised to act again, and to mandate that newly sold and installed RO systems be of the new "zero waste" type. The Uniform Plumbing Code (UPC) of the International Association of Plumbing and Mechanical Officials (IAPMO) is presently (circa 2000) in process of being specifically revised so as to set standards for the plumbing of zero-waste RO systems. Unfortunately, such a legislative mandate and/or plumbing code revision will do nothing to abate the cumulative wastage of many millions of RO systems that are already installed. For example, an estimated 3 million RO systems are already installed in the State of California alone.

As fresh water resources become more remote and more costly, certain areas of the world, including areas in America, are very willing to consider further water conservation measures—especially as would have no discernable performance impact on the water consumer. Zero waste RO systems are such an improvement: the consumer sees no change in the quality of the purified water.

Accordingly, it would be useful if some way could be devised for efficiently and economically retrofitting existing non-zero-waste RO systems to become of the zero-waste type. Such retrofitting would seemingly best use the labor of the homeowner, or a commercial building maintainer, or an installation team of semi-skilled laborers so as to avoid the expense of a journeyman plumber. According to the use of unskilled or semi-skilled labor, the retrofit would desirably be very simple, easy and foolproof. According to (i) the diversity of deployed RO systems, and (ii) the difficulty in eliciting from the building owner any specific information by which any retrofitted items might be selected or customized to a particular pre-installed RO system or a particular building, it would be preferable if any parts used in the retrofit process were (i) universally, or nearly universally, common, with (ii) little wastage of any unused parts.

If the cost of the waste water from an RO system is—as is typical in the U.S. circa 2000—but some few dollars per month, while,the cost of a retrofit kit, even as may be self-installed, is—as may be projected—some hundreds of dollars then the only owners of non-zero-waste RO systems who will be incentivized to retrofit to a zero waste type will likely be avid conservationists. However, a water district, or a municipality, can dictate retrofit of all non-zero-waste RO systems, provide a monetary incentive if desired. For example, a water district can simply (i) amortize the cost of an RO retrofit kit and its installation—which are both likely offered at no initial charge to district consumers—by amortizing the price therefore over a period of some years on a consumer's water bill, while (ii) penalizing with higher water rates those consumers who refuse to retrofit to, or install new, zero-waste RO systems.

In the case of consumers self-installing all new zero-waste RO systems, then these systems might typically be subject to cash rebates and other incentives (such as reduced water rates) by the water district; much as similar rebates are currently given in many U.S. water districts for the installation of low flush volume toilets.

However, merely offering a consumer either (i) a reduced rate or, more likely, (ii) the avoidance of a penalty rate, for water consumption if and when a consumer accepts and allegedly installs a zero-waste RO retrofit kit is not a complete solution. Some consumers may accept the kits to get the favorable rate, or avoid the penalty rate, but languish in performing the actual installation. And it is difficult for the water district to confirm installation, by monitoring water consumption or otherwise. It would therefore be useful if this entire retrofit process was well thought through prior to beginning a water-district-wide retrofit effort. It will be seen that the present invention accords for the return of a small and simple, but indispensable, used part from any non-zero-waste RO system to the water district to confirm either (i) retrofit to a zero-waste system, or (ii) dismantlement of the existing non-zero-waste system (whether attendant upon installation of a new zero-waste system or not) The part is normally readily easily unambiguously detectable as used, and it is not realistically feasible for the building owner to buy the (used) part in a hardware store and send to his or her water district as (fraudulent) "proof" of compliance.

2.2 Specific Previous Zero Waste RO Systems

The present invention will be seen to be primarily concerned with the physical partition, and packaging, of reverse osmosis (RO) systems, particularly of the zero-waste type. Being so focused, the present invention is not primarily directed to the flow paths and apparatus used to realize a zero-waste reverse osmosis system—of which there are several variant types—per se. Since it is useful to understand the principles of a zero waste RO system, and of the several variants of such systems, in assessing the structure and function of highly-integrated and compactly-packaged zero-waste RO systems in accordance with the present invention, the reader may care to make reference to the prior art in order to specifically understand zero waste RO systems.

Among this prior art, U.S. Pat. No. 4,626,346 to Hall discloses a reverse osmosis water purification system useful in limited water supply installations such as are found in recreational vehicles, boats and the like which use an unpressurized supply tank for the water source. According to the Hall patent, waste water from the reverse osmosis unit is recycled back to the supply tank to conserve water.

U.S. Pat. No. 5,639,374 for a WATER-CONSERVING PRESSURE-MAINTAINING REVERSE OSMOSIS SYSTEM to inventors including the selfsame Monroe who is the inventor of the present invention concerns a reverse osmosis water purification system in which the concentrate water normally produced by the process is not disposed of by routing it to a drain line or otherwise, but is redirected to the main water supply. The system includes the well-known components of a reverse osmosis membrane, pre-filters which are installed ahead of the reverse osmosis membrane, and an appropriate tank to store the purified water. In addition, the system includes a pump and associated pressure sensing device for increasing the pressure of the incoming non-processed water to the reverse osmosis unit, and a pipe to carry the concentrate water from the reverse osmosis unit to the incoming main water supply, be it either a cold or hot water line. Additionally included is a one-way check valve in the concentrate water line, and a sensing device in the purified water storage tank to turn the pump off whenever the quantity of water in the tank exceeds a predetermined amount.

Notably in construction of the Monroe, et al. system, and as an important feature carried over into the preferred embodiments of systems in accordance with the present invention, a flow connection between the (i) waste outlet port of a RO unit, and (ii) a pressurized water source, is both unconstricted and unrestricted. By this unconstricted and unrestricted connection the waste, or concentrate, water from the RO unit encounters during its entire conveyance the full and exact pressure of the supply water. Being that there is no pressure differential, nor any (pressure-differential-inducing) obstruction, within the flow conduit, there is no build-up of contamination in the flow path—which is operationally important.

U.S. Pat. No. 5,879,558 to Monroe, et al., for a WATER CONSERVING REVERSE OSMOSIS UNIT AND METHOD OF OPERATING IT likewise discloses a reverse osmosis water purification system in which the concentrate water which is normally produced by the process is not disposed of by routing it to a drain line or otherwise, but is instead redirected to the main water supply. The system includes the well-known components of a reverse osmosis membrane, pre-filters which are installed ahead of the reverse osmosis membrane, and an appropriate tank to store the purified water. In addition, the system includes a pump and associated pressure sensor for increasing the pressure of the incoming non-processed water to the reverse osmosis unit, means for directing the concentrate water from the reverse osmosis unit to the incoming main water supply (cold), or to a hot water line. Additionally included is a one-way check valve in the concentrate water line, and a sensor sensing the pressure of water in the storage tank and turn the pump off whenever the pressure exceeds a predetermined value.

As with the '374 patent, a concentrate water pipe conveys concentrate water from a reverse osmosis unit to a downstream location of a water source that is essentially at the supply pressure. Although this concentrate water pipe includes a check valve for preventing water from the water source to flowing into the reverse osmosis unit (at the wrong point—the concentrate water output) such as under transient pressure surges, this pipe is again without any substantial pressure drop or flow restriction whatsoever. Namely, the check valve neither produces any substantial flow restriction nor any substantial pressure drop to the normal, outward, flow of concentrate water.

2.3 Integrated Packaging of Multiple Components of RO Systems

The present invention will be seen to be concerned with the partitionment, and packaging, of the multiple components of a reverse osmosis system (preferably of the zero-waste type), particularly such partition and packaging as provides a higher degree of integration than heretofore, simplifying both installation, and/or retrofit, of an RO system so greatly that these tasks may be reliably performed by amateurs.

A step towards the integration of several components of a RO system into a single unit is shown in U.S. Pat. No. RE 35,252 to Clack, et al., for a FLUID FLOW CONTROL DEVICE FOR WATER TREATMENT SYSTEMS. The Clack, et al., patent shows new and improved filtration purification or water treatment systems for providing improved purified drinking water at a point of use which systems are provided with a substantially leak-free fluid flow control device to which the other filtration purification system elements may be mated and engaged. Other system elements may include various filters or filter modules, as well as system leads for conveying (i) incoming tap water in, (ii) outgoing waste water out to drain and (iii) purified water from the filter section to a storage tank until desired for use. The fluid flow control device is preferably a unitary thermoplastic body formed from a pair of interconnecting halves, the body having (i) a number of discrete fluid flow passages extending therein, and (ii) mating grooves by which the halves are joined. In a preferred embodiment, the fluid flow control device includes each of (i) integrally formed input/output connector features, (ii) filter-receiving socket portions and (iii) an automatic shut off valve disposed in fluid flow communication with certain ones of the passages.

SUMMARY OF THE INVENTION

The present invention contemplates a certain, particular, partitionment and packaging of the multiple components of RO systems—particularly as are used in RO systems of the zero waste type—for use in (i) retrofitting diverse existing non-zero-waste RO systems to become zero waste RO systems, (ii) constructing new RO systems, particularly of the zero-waste type. The RO system so partitioned, and the RO system components so packaged, are characterized by being but few in number, and highly integrated.

Characteristically the plumbed connections of a zero-waste reverse osmosis system in accordance with the present invention—while retaining the RO filter, purified water storage tank, and numerous valves and gauges characteristic of an RO system—are reduced to three (only) monolithic sub-assemblies, and these three sub-assemblies are themselves preferably physically co-mounted, and readily flow-connected together into one single assembly. Still more particularly, the preferred three sub-assemblies and assembly are preferably made of plastic, and typically serve in combination to integrate three major flow paths and eight associated RO components. A practitioner of the RO system design and fabrication arts will immediately appreciate that an RO system component normally has at least one (as in the case of a gauge) or two (as in the case of a valve) plumbed connections. As just stated, there are typically some eight RO system components. Therefore, the sub-assemblies of the present invention which, when delivered into service, need be plumbed only at their "input" and "output", can be fairly described as being "highly integrated".

The entire present invention is thus more concerned with the physical partitionment and physical packaging of (zero waste) RO systems than with the theory and the plumbing flow paths of these systems. This means that (i) the plumbed pathways of zero-waste RO systems realized by application of the present invention are not represented to be unique, and (ii) the present invention is not concerned with new methods, or new flow paths, for the conduct of zero-waste RO. Instead, the partitionment and packaging concerns of the present invention are directed to sub-assemblies and assemblies that, being astutely designed, serve to support both (i) the efficient, economic and reliable retrofitting of diverse pre-existing non-zero-waste RO systems to become zero-waste RO systems by but modest use of unskilled or semi-skilled labor, and also, (ii) the construction of new RO systems—particularly of the zero-waste type—having an unparalleled high degree of components integration so as to better support improved economies-of-installation, system reliability, and system longevity.

The new-form, highly-integrated, (zero-waste type) RO system sub-assemblies and assemblies in accordance with the present invention are visually distinguishable from previous RO systems in that, inter alia, the number of different assemblies or sub-assemblies in the system is greatly reduced, typically from as many as ten or more (i.e., 10+) to only three or four. In a simplest terms, system fluid flow paths that used to be plumbed externally between flow-connected system components are brought into the interiors of monolithic subassemblies, and functional components of the (zero-waste type) RO system are threadingly connected through fittings.

Meanwhile, simultaneously, (ii) all system operator controls and indicators are ergonomically located in an orderly and accessible fashion. For example, some three pressure gauges typically within a single preferred sub-assembly in accordance with the present invention are all located neatly in a line, and are oriented so that the nominal correct pressure reading on each gauge produces an equal angular displacement of that gauge's pointer indicator against a green-red (good-bad) scale. Accordingly, the correct operation of the system is discernable at a glance. All owner/user manipulatable valves and the like, and all system components, are similarly clearly and logically situated and marked, removing much of the mystery as to what is what and, more importantly, permitting troubleshooting and repair directions to be given to amateurs, as in "twist the red valve clockwise in the direction of the red arrow".

The high degree of system integration permitted by the monolithic sub-assemblies and assembly of the present invention supports, among other things, the conversion of diverse existing non-zero-waste RO systems may typically be converted to zero-waste RO systems simply by disconnecting three only existing plumbing unions (which are normally of a quite standard nature), and re-connecting each of the six ends so created (as may be extended by use of simple extensions, and/or adapted by simple adapter fittings, as is infrequently necessary) to, most typically, the preferred three new monolithic sub-assembles that are themselves mounted to a single new frame or back plane, forming thereby an assembly that most typically flow-connects, most typically, some eight or more different components.

After (i) flow connections are realized by the simple turning of fittings, (ii) the preferred major assembly, which contains an electric pump, is plugged to power, and (iii) a system water supply is turned back on, the entire job of retrofitting a zero-waste RO system is finished. Such simplicity of installation is not typical of previous RO systems of any type, and the inventive concept of efficiently retrofitting existing non-zero-waste RO systems using monolithic sub-assemblies and assemblies to make these RO system into the zero-waste type is not known by the inventor to have previously existed.

1. Monolithic (Sub-)Assemblies, Particularly for Making a Zero-waste Reverse Osmosis System In one of its aspects the present invention is embodied in one or more (first-level, or sub-) assemblies, The (sub-) assemblies may be, and preferably are, packaged as a kit for use in retrofitting a pre-existing non-zero-waste reverse osmosis system to become zero-waste. They may also be effectively used in new construction RO systems, particularly of the zero-waste type. All (sub-) assemblies are thus used in a reverse osmosis system flowing water between an inlet port receiving pressurized unpurified water and a first outlet port flowing purified water and a second outlet port flowing waste water.

One such monolithic (sub-) assembly ("sub-assembly 1") is usable in a portion of the reverse osmosis system between the inlet port and a reverse osmosis membrane vessel.

This (sub-) assembly 1 includes (i) a monolithic molded body defining a fluid flow channel between (1) an input portal suitably connected externally to the body to a pressurized flow of unpurified water and (2) an output portal suitably connected externally to the body to a reverse osmosis membrane vessel. It further includes (ii) a first portal, molded within the body, communicating fluid pressure from the fluid flow channel within the body to a pressure switch external to the body, and (iii) a second portal, molded within the body downstream of the first portal, communicating fluid pressure from the fluid flow channel within the body to a pressure gauge external to the body.

By this construction, and this coaction, the (i) body flow connects a pressurized flow of unpurified water to a reverse osmosis membrane vessel while communicating fluid flow pressure to both an external pressure switch and an external pressure gauge.

Preferably the (ii) first portal communicates fluid pressure from the fluid flow channel within the body to an electronic pressure switch that serves to control a valve for cutting off fluid flow to the assembly, and to the reverse osmosis system, when and for so long as a predetermined pressure is exceeded.

Another, separate, such monolithic (sub-) assembly ("sub-assembly 2") is usable in a portion of a reverse osmosis system flowing water between an inlet port receiving pressurized unpurified water and a first outlet port flowing purified water and a second outlet port flowing waste water.

This monolithic (sub-) assembly 2 usable in a portion of the reverse osmosis system between purified water output from a reverse osmosis membrane vessel and the first outlet port includes (i) a monolithic molded body defining a fluid flow channel between (1) an input portal suitably connected externally to the body to a pressurized flow of purified water from a reverse osmosis membrane vessel and (2) an output portal flowing purified water. It further includes (ii) a first portal, molded within the body, communicating fluid pressure from the fluid flow channel within the body to a pressure switch external to the body, and (iii) a check valve in the fluid flow channel within the body for preventing any flow of fluid from the output portal to the input portal.

By this construction, and this coaction, the (i) body of the second (sub-) assembly serves to unidirectionally flow connect a pressurized flow of purified water from a reverse osmosis membrane vessel to an outlet portal while also communicating fluid flow pressure to an external pressure switch. The (iii) check valve is preferably press fitted within the fluid flow channel of the (i) body.

Still yet another, separate, such monolithic (sub-) assembly ("sub-assembly 3") is usable in reverse osmosis system flowing water between an inlet port receiving pressurized unpurified water and a first outlet port flowing purified water and a second outlet port flowing waste water.

This monolithic (sub-) assembly 3 usable in a portion of the reverse osmosis system between a waste water output from a reverse osmosis membrane vessel and the second outlet port includes (i) a monolithic molded body defining a fluid flow channel between (1) an input portal suitably connected externally to the body to a pressurized flow of purified water from a reverse osmosis membrane vessel and (2) an output portal flowing waste water. It further includes (ii) a first portal, molded within the body, communicating fluid pressure from the fluid flow channel within the body to a first pressure gauge external to the body, and (iii) a check valve, located in the fluid flow channel of the body downstream from the first portal, preventing any flow of fluid from the output portal to the input portal.

By this construction, and this coaction, the (i) body flow unidirectionally connects a pressurized flow of purified water from a reverse osmosis membrane vessel to an outlet portal while communicating fluid flow pressure to an external pressure switch.

This third (sub-) assembly preferably also has (iv) a second portal, molded within the body downstream from the check valve, communicating fluid pressure from the fluid flow channel within the body to a pressure gauge external to the body. The (iii) check valve is preferably of the back-to-back dual type, and is preferably molded within the fluid flow channel of the (i) body. The check valve may alternatively be press fitted within the fluid flow channel of the body.

It is clear the (sub-) assemblies 1–3 are similar. They may all be used—connected as appropriate including to each other—in a single RO system. They are thus commonly described as "sub-assemblies", and their combination as an "assembly", although it is clear the "sub-assembles" 1–3 may be individually beneficially employed.

The plumbed connections to the inlet portal and to the outlet portal or any of the sub-assemblies 1–3 may be either (i) press fitted and/or (ii) threaded and screwed.

Any of the sub-assemblies 1–3 may have and present at least one tab by which the assembly is suitably physically mounted to a backboard.

Finally, any and all of the sub-assemblies 1–3 may be, and preferably are, used in a zero-waste reverse osmosis system.

These and other aspects and attributes of the present invention will become increasingly clear upon reference to the following drawings and accompanying specification.

BRIEF DESCRIPTION OF THE DRAWINGS

Referring particularly to the drawings for the purpose of illustration only and not to limit the scope of the invention in any way, these illustrations follow:

FIG. 2b is a diagrammatic perspective view of the same preferred major assembly of the present invention, used in a retrofit zero-waste reverse osmosis system previously seen in FIG. 2a.

DESCRIPTION OF THE PREFERRED EMBODIMENT

Figure 1:
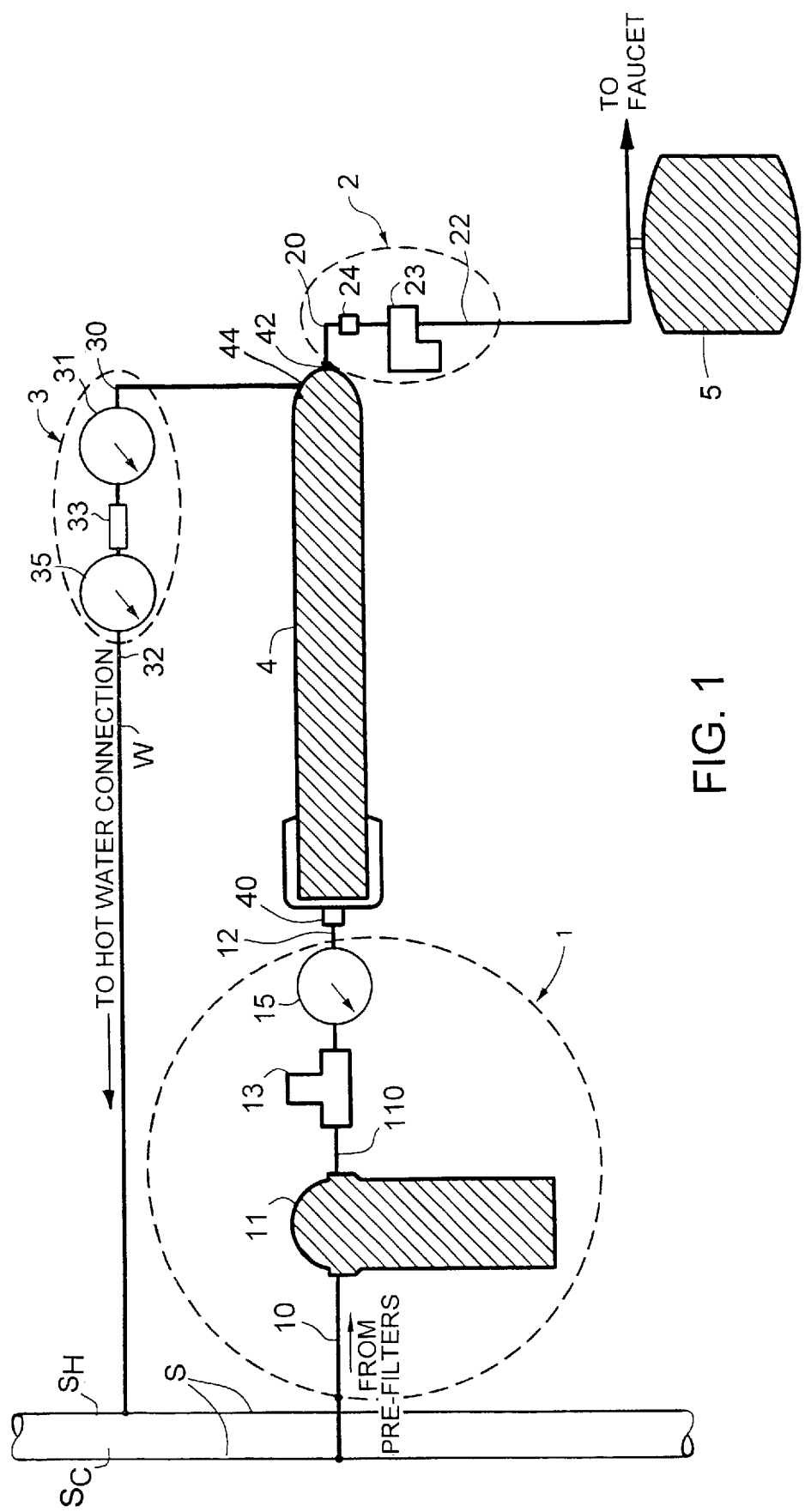
FIG. 1 is an iconic representation, and flow schematic, of a preferred embodiment of a reverse osmosis system retrofitted with (sub-) assemblies in accordance with the present invention so as to become zero-waste.

The following description is of the best mode presently contemplated for the carrying out of the invention. This description is made for the purpose of illustrating the general principles of the invention, and is not to be taken in a limiting sense. The scope of the invention is best determined by reference to the appended claims.

In the system of numbering used in this specification odd numbers refer to physical objects which are most commonly the component, sub-assemblies and assemblies of reverse osmosis systems. Even numbers refer to ports, channels, conduits and like concepts which—although indisputably physically realized by plumbing connectors and piping and the like—are useful in referring to intangibles such as flow paths, points of plumbed connection, and the like.

In the ensuing specification disclosure the use of the sub-assemblies and assembly of the present invention in retrofitting an existing RO system to become of the zero waste type is advanced. It is thus useful to understand that an RO system to be retrofitted has at least a reverse osmosis membrane vessel and a purified water storage tank. In this conventional non-zero-waste RO system water from a source of water is converted into purified water at a first outlet port, and waste water is produced at a second outlet port, of the reverse osmosis membrane vessel.

In this environment the preferred three sub-assemblies of the present invention may be packed together as a kit. The kit consists of one or more—and preferably all three—of the preferred first-level assemblies, or sub-assemblies, of the present invention. The kit preferably includes an integrally-packaged first sub-assembly having an inlet port that is flow-connected to a pump that is flow-connected to a solenoid valve that is flow-connected to a pressure gauge that is flow-connected to an outlet port. This integrally-packaged first sub-assembly is installed in-line a flow of supply water, with its inlet port flow-connected to the source of water, and with its outlet port flow-connected to an inlet port of the reverse osmosis membrane vessel.

The kit of, most preferably, three sub-assemblies preferably still further includes an integrally-packaged second sub-assembly having an inlet port that is flow-connected to a check valve that is flow-connected to a tank shut-off valve that is flow-connected to an outlet port. This integrally-packaged second sub-assembly is installed in-line a flow of purified water, with its inlet port flow-connected to the first outlet port of the reverse osmosis membrane vessel, and with its outlet port flow-connected to the purified water tank.

The kit of, preferably, three sub-assemblies preferably yet still further includes an integrally-packaged third sub-assembly having an inlet port that is flow-connected to a pressure gauge that is flow-connected to a dual check valve that is flow-connected to another pressure gauge that is flow-connected to an outlet port. This integrally-packaged third sub-assembly is installed in-line a flow of waste water, with its inlet port flow-connected to the second outlet port of the reverse osmosis membrane vessel, and with its outlet port flow-connected to the source of water.

Any, and preferably all three of the integrally-packaged first sub-assembly, second sub-assembly, and third sub-assembly are themselves integrally (i) flow-connected (via intervening components) and (ii) physically mounted together as one single monolithic assembly. The retrofit kit therefore preferably consists of but one single assembly consisting of three sub-assemblies, plus associated minor universal plumbing connection and wall mounting hardware—which is clearly a good start towards simplifying installation. The retrofit kit connects to, and uses, components of the existing non-zero-waste RO system, most notably (i) any filters or pre-filters, (ii) the reverse osmosis membrane vessel, and (iii) the purified water storage tank.

1. The Detail Preferred (Sub-) Assemblies

Figure 3:
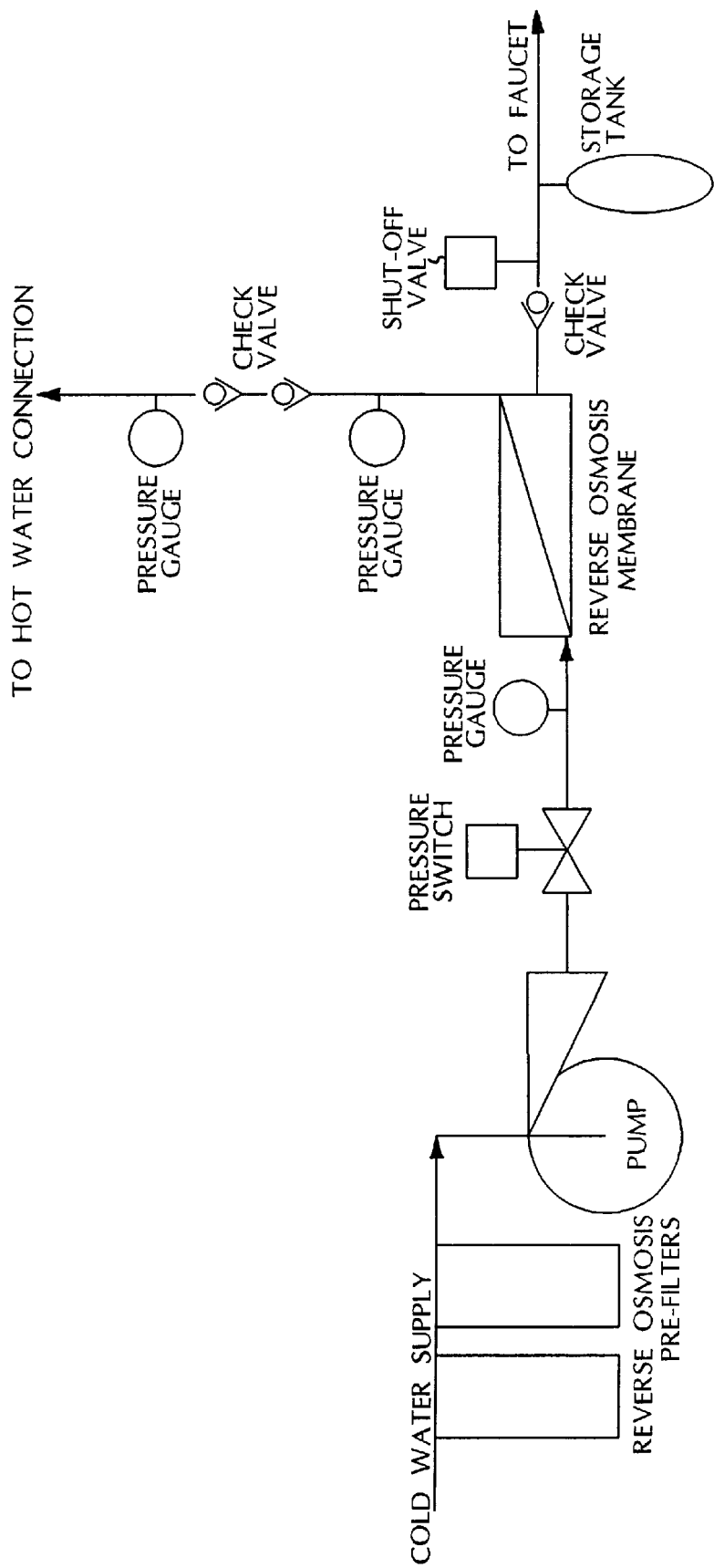
FIG. 3 is a flow schematic diagram of a first preferred embodiment of a zero-waste reverse osmosis system using the preferred sub-assemblies and assembly in accordance with the present invention.

An iconic representation of a reverse osmosis system retrofitted to become zero-waste by use of preferred (sub-) assemblies in accordance with the present invention is shown in FIG. 1. Fluid flow within the RO system, as is more particularly shown in the schematic of FIG. 3, is in substantial accordance with the teaching of U.S. Pat. No. 5,639,374 to Monroe, et al. for a WATER-CONSERVING PRESSURE-MAINTAINING REVERSE OSMOSIS SYSTEM.

In the retrofitted zero-waste reverse osmosis system of FIG. 1 only (i) filters and pre-filters, if any be present, (ii) a reverse osmosis membrane vessel 4 (with an internal membrane), and (iii) a purified water storage tank remain from a previous non-zero-waste RO system. (Still further additional components, such as water supply valves, not relevant to the present analysis, may also remain: see FIGS. 3 and 4) The connections to a water source S—most commonly to a cold water source $S_C$—and to a faucet F where purified RO water is output, existed in the previous RO system. The waste water outlet port 44 of the reverse osmosis membrane vessel 4 was connected to a drain (not shown). In accordance with the established principles and construction of zero-waste RO systems, this waste water will be returned to waters supply S, most commonly to the hot water supply $S_H$ as illustrated.

Accordingly, the preferred first-level assemblies, or sub-assemblies, 1, 2, 3 of the present invention are added during the retrofit process, and it is the partitionment, placement, nature, construction and connection of these sub-assemblies 1, 2, 3 that constitutes one principal aspect of the present invention.

All sub-assemblies 1, 2, 3 are integrally-packaged, meaning that all components (hereinafter described) within each such sub-assembly 1, 2, 3 come pre-packaged together, and are not intended to ever be separated. Additionally, the sub-assemblies 1, 2, 3 themselves are preferably packaged together—integrally, if this term is not held to be identical to monolithic—upon a common frame, or substrate, 45—as is most clearly seen in FIG. 2b.

Returning to FIG. 1, the sub-assembly 1 has an inlet port flow-connected to a pump 11 flow-connected to a solenoid valve 13 flow-connected to a pressure gauge 15 flow-connected to an outlet port 12. It is clearly installed in-line the flow of water from the source or water S, with the inlet port being flow-connected to this source of water S. The outlet port 12 is flow-connected to an inlet port 40 of the reverse osmosis membrane vessel 4, as illustrated.

The sub-assembly 2 has its inlet port 20 flow-connected to a check valve 24 which is flow-connected to a tank shut-off valve 23 which is flow-connected to an outlet port 22. This sub-assembly 2 is clearly installed in-line the flow of purified water from the reverse osmosis membrane vessel 4. Namely, the inlet port of assembly 2 is flow-connected to the first outlet port 42 of the reverse osmosis membrane vessel 4. The outlet port 22 of sub-assembly 2 is flow-connected to the purified water tank 5.

The third sub-assembly 3 has an inlet port which is flow-connected to a pressure gauge 31 which is flow-connected to a dual check valve 33 which is flow-connected to a pressure gauge 35 which is flow-connected to an outlet port 32. This third sub-assembly 3 is installed in-line the flow of waste water from the reverse osmosis membrane vessel 4. Namely, the inlet port of the third assembly 3 is flow-connected to the second outlet port 44 of the reverse osmosis membrane vessel 4. The outlet port 32 of the third assembly 3 is flow-connected to the source of water S, and preferably and more particularly to a source of not water $S_H$.

Figure 2A:
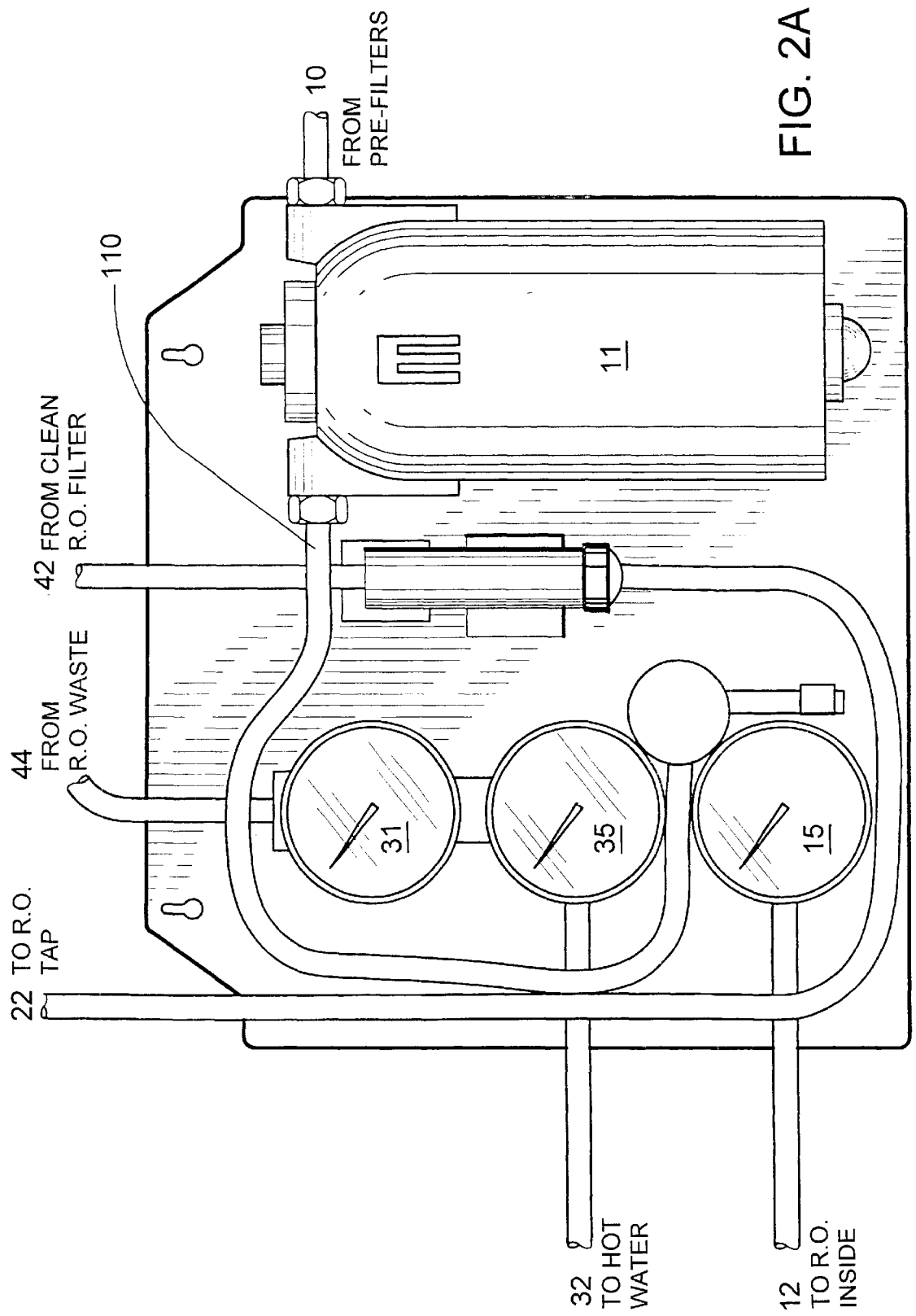
FIG. 2a is a pictorial view of a preferred major assembly of the present invention, consisting of three (3) preferred sub-assemblies, used in retrofiting a reverse osmosis system as was previously seen in FIG. 1. Plumbed connections to the assembly are shown, and with certain assembly fluid flow paths being indicated in phantom line.

The sub-assemblies 1, 2, 3 are packaged as a kit. In accordance with the present invention any two, and preferably all three, of the assemblies 1, 2, 3 are physically mounted to the same frame, or substrate, or back plane, 45 as is most particularly illustrated in FIG. 2. The sub-assembles are thus presented as but a single unit. A pictorial illustration of such a preferred packaging, and single unit, is shown in FIG. 2, consisting of FIGS. 2a and 2b. The major sub-assemblies 1, 2, 3 are all packaged together in a single unit as shown. Some six (6) plumbed connections 10, 12; 20, 22; and 30, 32 all previously seen in FIG. 1 are again marked on FIG. 2, and are most clearly visible in FIG. 2b. Fluid flow paths within the individual sub-assemblies 1, 2 and 3 are indicated in phantom line. Likewise, selected visible components of the zero-waste RO system 1 are, numbered identically in FIG. 2 as in the flow schematic of FIG. 9.

Clearly the integrally packaged sub-assemblies 1, 2 and 3 have some six (6) plumbed connections: 10, 110/12, 44, 32, 42 and 22. There is one only, low-voltage, electrical connection per the electrical schematic of FIG. 8. A.C. power 91 is converted to low voltage, nominally 24 v.a.c., in transformer 93, and used to supply, in electrical series, both the coil of the solenoid 95 of the tank shut-off valve 23 (shown in FIG. 1) and the pump motor 11 (shown in FIGS. 1 and 9). The 24 v.a.c., power is gated to both the coil of the solenoid 95 of the tank shut-off valve 23 and the motor 11 by tank pressure switch 97. Both (i) fluid and (ii) electrical connections are therefore limited, and straightforward.

In accordance with the present invention, the diversity of functions performed within the monolithic assembly—which functions may be understood by reference to the aforementioned U.S. Pat. No. 5,639,374—clearly does not necessitate that the multiple components performing these functions cannot be integrally housed in but a single unit. In actual fact, some three (3) different flow paths, and a nominal eight (8) different components of a zero-waste RO system are tightly integrated and packaged in, and by, the preferred retrofit kit of FIGS. 1 and 2.

Figure 4:
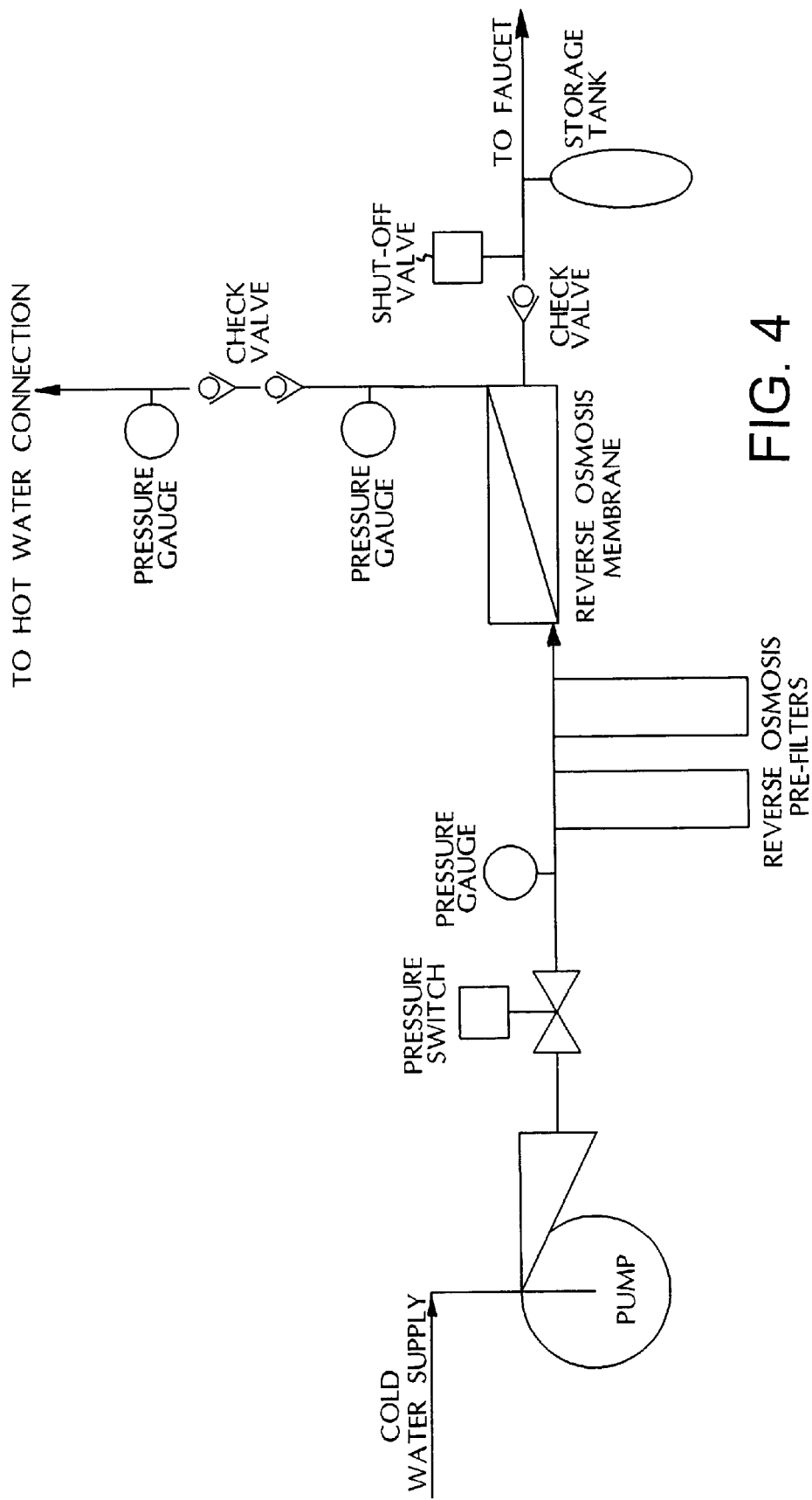
FIG. 4 is a flow schematic diagram of a second preferred embodiment of a zero-waste reverse osmosis system using the preferred sub-assemblies and assembly in accordance with the present invention.

A schematic diagram of a first preferred embodiment of a zero-waste reverse osmosis system in accordance with the present invention is shown in FIG. 3, and a like schematic diagram for a second preferred embodiment is shown in FIG. 4.

Figure 5:
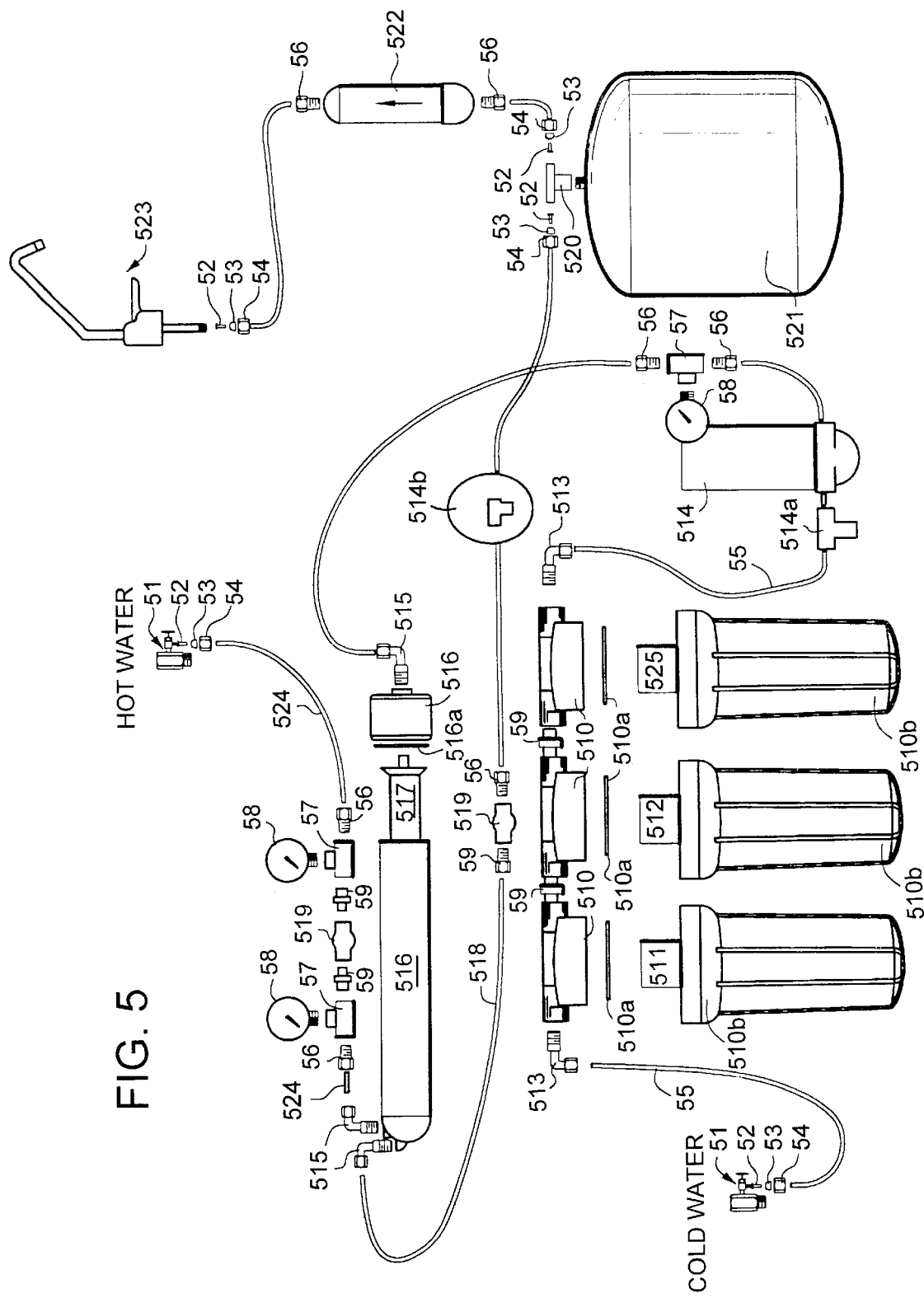
FIG. 5 is an iconic representation, and flow schematic, of a first preferred embodiment of a new-construction zero-waste reverse osmosis system using the preferred sub-assemblies and assembly in accordance with the present invention.
Figure 6:
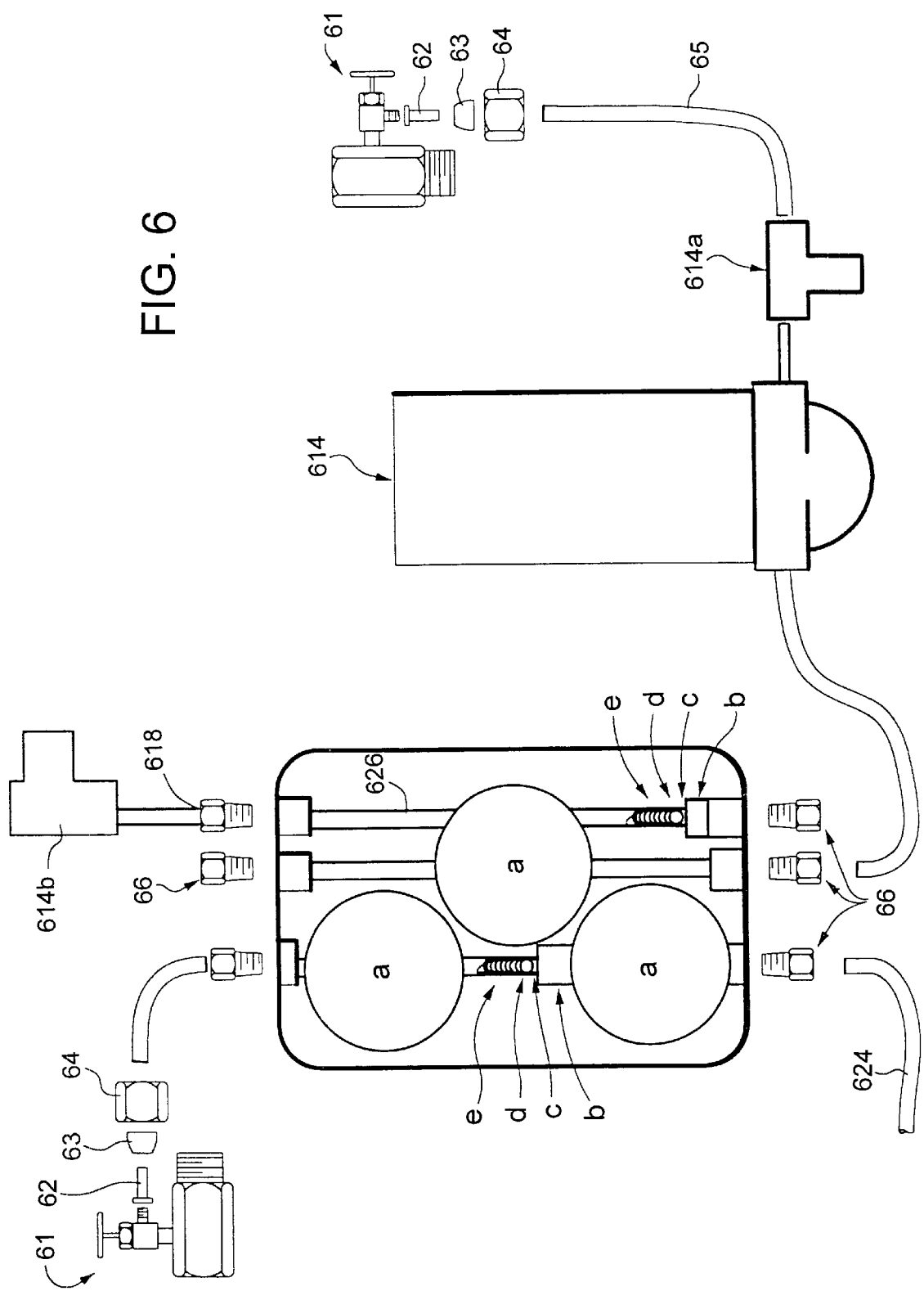
FIG. 6 is an iconic representation, and flow schematic, of a second preferred embodiment of a new-construction zero-waste reverse osmosis system using the preferred sub-assemblies and assembly in accordance with the present invention.

An iconic representation of a first preferred embodiment of a new-construction zero-waste reverse osmosis system using the preferred sub-assemblies in accordance with the present invention is shown in FIG. 5, and a like representation of a second embodiment is shown in FIG. 6.

The wetted parts list for the new-construction zero-waste reverse osmosis system shown in FIG. 5 is as follows:

| Item No. | Qty. | Description | NSF Material | Yes | No |
| --- | --- | --- | --- | --- | --- |
| 51 | 2 | *Easy Tap Adapter | Brass CDA 360 | x | |
| 52 | 5 | *¼" Brass Insert | Brass CDA 360 | x | |
| 53 | 5 | *¼" Delrun Sleeve | Delrun | x | |
| 54 | 5 | *¼" Brass Compression Nut | Brass CDA 360 | x | |
| 55 | 4' | *¼" Green Poly tubing | Polyethylene | x | |
| 56 | 5 | *Celcon Connection ¼" C × ¼" MPT | Celcon | x | |
| 57 | 3 | *Tee Brass ¼" FPT All Ends | | | x |
| 58 | 3 | *0–100 ¼" Bottom Mount Pressure Gauge | | | x |
| 59 | 4 | ¼" MPT brass hex nipple | Brass CDA 360 | x | |
| 510 | 3 | 10" Filter Housing Lid | Polypropylene | x | |
| 510a | 3 | 10" Filter Housing O-ring | | x | |
| 510b | 3 | 10" Filter Housing Sump | Polypropylene | x | |
| 511 | 1 | 10" Spun Sediment filter cartridge | Polypropylene | x | |
| 512 | 1 | 10" 56 cubic inch GAC filter cartridge | | x | |
| 514 | 1 | *Booster Pump | | x | |
| 514a | 1 | *Electronic Solenoid valve (ESO) | | | x |
| 514b | 1 | *Electronic tank pressure switch (TSO) | | x | |
| 515 | 3 | Celcon Elbow ¼" C × ⅛" MPT | Celcon | x | |
| 516 | 1 | Membrane Vessel housing | Polypropylene | x | |
| 516a | 1 | Membrane Vessel housing O-ring | | x | |
| 517 | 1 | TFM membrane | | x | |
| 518 | 6' | *¼" Blue Poly Tubing | Polyethylene | x | |
| 519 | 2 | *¼" FPT Check Valve | | | x |
| 520 | 1 | ¼" Brass tank tee | Brass CDA 360 | x | |
| 521 | 1 | 3 Gallon Storage Tank | | x | |
| 522 | 1 | (Larger/Size) 10" line GAC final polishing filter | | x | |
| 523 | 1 | Faucet | | x | |
| 524 | 4' | *¼" Black Poly tubing | Polyethylene | x | |
| 525 | 1 | 10" 10-micron Carbon Block Filter cartridge | | x | | where
*= Components that are integrated into single assembly, or module
<u>Underline</u> = Components that are decreased in volume from a normal, non-integrated, RO System
*Italic* = Components that are increased in volume, or added, relative to a normal, non-integrated, RO System The wetted parts list for the second new-construction zero-waste reverse osmosis system of FIG. 6 is as follows:

| Item No. | Qty. | Description | NSF Material | Yes | No |
| --- | --- | --- | --- | --- | --- |
| 61 | 2 | *Easy Tap Adapter | Brass CDA 360 | x | |
| 62 | 2 | *¼" Brass Insert | Brass CDA 360 | x | |
| 63 | 2 | *¼" Delrin Sleeve | Delrun | x | |
| 64 | 2 | *¼" Brass Compression Nut | Brass CDA 360 | x | |
| 65 | 3' | *¼" Green Poly tubing | Polyethylene | x | |
| 66 | 6 | *Celcon Connection ¼" C × ¼" MPT | Celcon | x | |
| 614 | 1 | *Booster Pump | | x | |
| 614a | 1 | *Electronic Solenoid valve (ESO) | | | x |
| 614b | 1 | *Electronic tank pressure switch (TSO) | | x | |
| 618 | 2' | *¼" Blue Poly Tubing | Polyethylene | x | |
| 624 | 3' | *¼" Black Poly tubing | Polyethylene | x | |
| 626 | 1 | *Zero Waste Module housing | Polypropylene | | x |
| | 3 | *a) ⅛" FPT Center mount 0–100 pressure gauge | | | x |
| | 2 | *b) Internal plug or disk | Polypropylene | | x |
| | 2 | *c) Vitron o-ring | Vitron | | x |

-continued

| Item No. | Qty. | Description | NSF Material | Yes | No |
|---|---|---|---|---|---|
| | 2 | *d) Vitron or Teflon ball | | | x |
| | 2 | *e) 316 Stainless Steel spring | | | x | where
*= Components that are integrated into single assembly, or module
Underline = Components that are decreased in volume from a normal, non-integrated, RO System
Italic = Components that are increased in volume, or added, relative to a normal, non-integrated, RO System Italic=Components that are increased in volume, or added, relative to a normal, non-integrated, RO System Note in the parts lists for both FIGS. 5 and 6 the large numbers of components, indicated by an asterisk, that are integrated into a single, major, assembly. Note that the underlined components are generally decreased in volume from counterpart components present within a counterpart previous non-integrated (zero-waste) RO system. These underlined components generally outnumber, and represent a greater cumulative volume, than those components that are listed in boldface, meaning that the are enlarged, or added, from the counterpart previous non-integrated (zero-waste) RO system. The preferred materials for all components are given.

Figure 7:
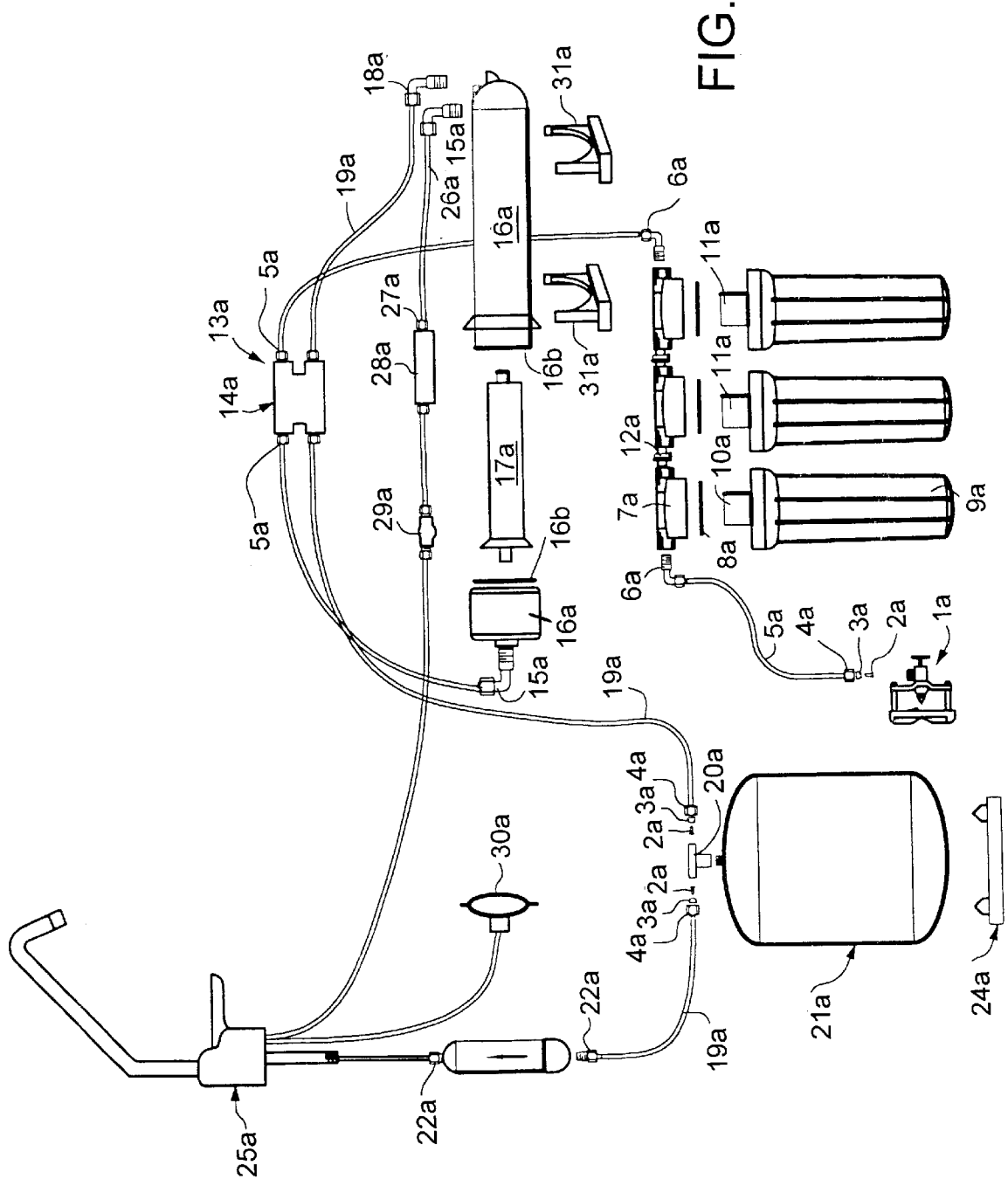
FIG. 7 is an iconic representation, and flow schematic, of the adaptation of the principles of the present invention to a reverse osmosis system that is not zero-waste.

The packaging principles of the present invention may be adapted for reverse osmosis system, otherwise of conventional design, that is not zero-waste. Such a system is illustrated in FIG. 7. The wetted parts list for this non-zero-waste reverse osmosis system is as follows:

| Item # | Description |
|---|---|
| 1a | Valve self piercing |
| 2a | *Insert brass ¼" |
| 3a | *Sleeve-Delrin ¼" |
| 4a | *Nut-brass ¼" compression |
| 5a | *Tubing green ¼" |
| 6a | Elbow-Plastic ¼" C × ¼" MPT |
| 7a | Lid ¼" FPT |
| 8a | O-ring filter housing |
| 9a | Housing-filter 10" |
| 10a | Sediment-10"-spun (5M-10) |
| 11a | Carbon-10"- 56 cu. in. (GAC-10-56) |
| 12a | Hex-Nipple-Brass ¼" MPT |
| 13a | Nut-plastic black ¼" compression |
| 14a | Valve - Shut Off |
| 15a | Elbow-Plastic ¼" C × ⅛" MPT |
| 16a | Membranes Vessel Housing |
| 16b | O-ring membrane housing |
| 17a | MEM-TFM-18 |
| 18a | Elbow Check Valve ¼" C × ⅛" MPT |
| 19a | *Tubing Blue ¼" |
| 20a | Tank Tee brass |
| 21a | 3 gallon Storage tank blue |
| 22a | *Connector plastic ¼" c × ¼" MPT |
| 23a | Inline-6" final Polishing filter (1M6) |
| 24a | Tank Stand |
| 25a | Faucet Air-gap Chrome |
| 26a | Tubing black ¼" |
| 27a | Nut white plastic compression |
| 28a | Flow restrictor |

-continued

| Item # | Description |
|---|---|
| 29a | Union-plastic ¼" C × ¼" C |
| 30a | Drain saddle ⅜" C |
| 31a | Vessel mounting Clips | where
*= Components that are integrated into single assembly, or module
Underline = Components that are decreased in volume from a normal, non-integrated, RO System
Italic = Components that are increased in volume, or added, relative to a normal, non-integrated, RO System As before, the packaging principles of the present invention make for a more compact system with a higher degree of integration than heretofore.

Figure 8:
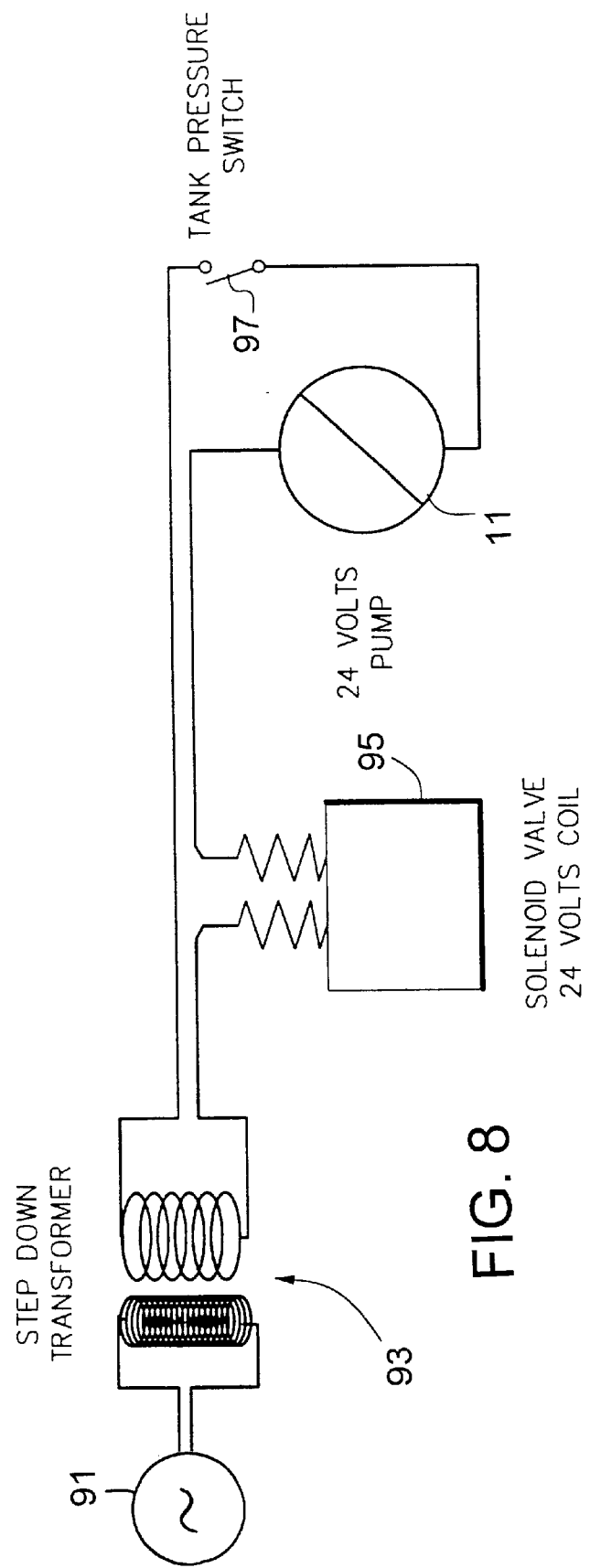
FIG. 8 is an electrical schematic diagram of the use of the preferred sub-assemblies and assembly in accordance with the present invention in a retrofit zero-waste reverse osmosis system, previously seen in FIGS. 1–2.

An electrical schematic of either preferred embodiment of a zero-waste reverse osmosis system made from the preferred sub-assemblies, and assembly, in accordance with the present invention is shown in FIG. 8.

Figure 9:
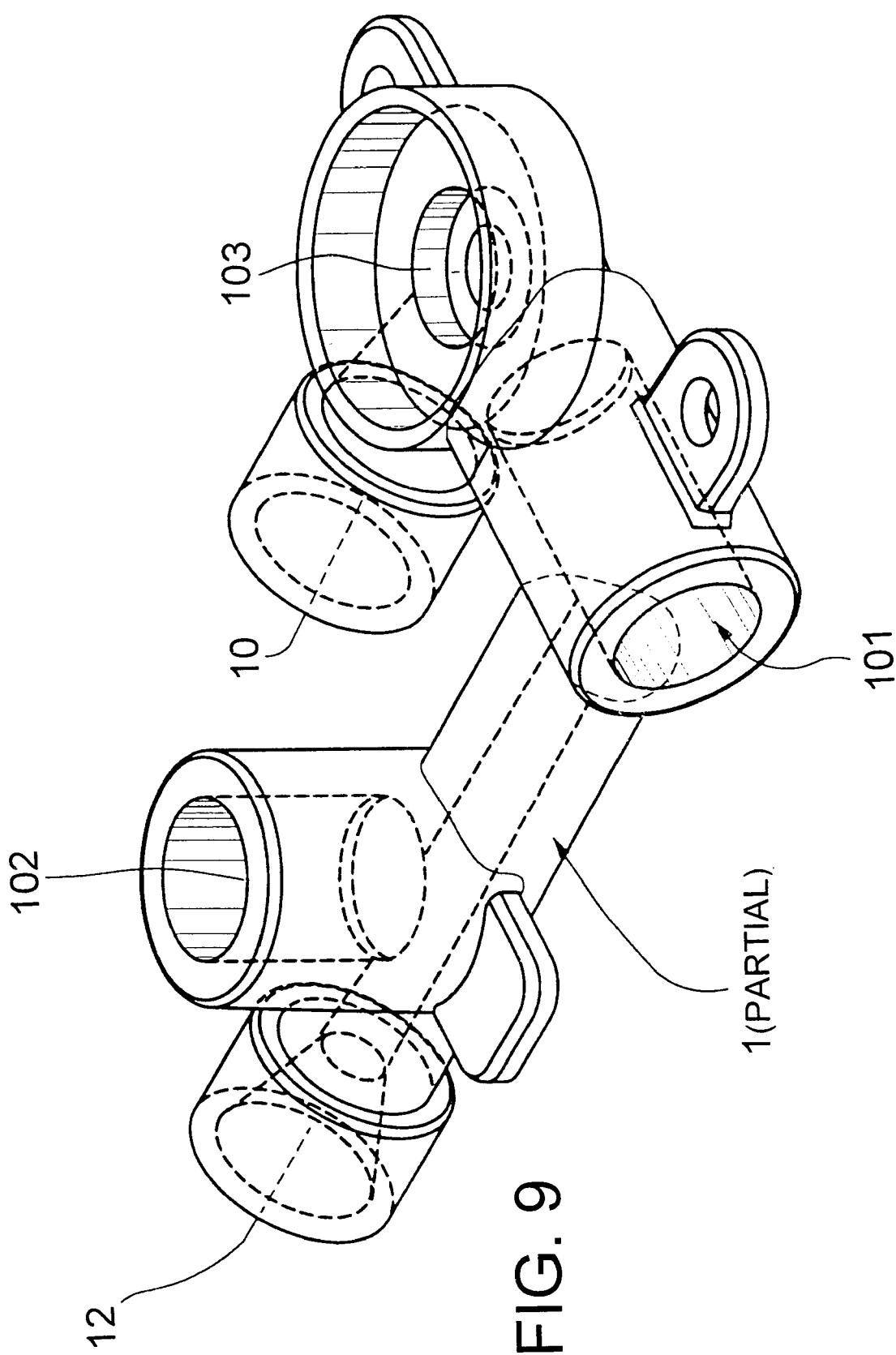
FIG. 9 is a pictorial view of a preferred first housing containing and defining a flow channel, which first housing is part of the preferred first subassembly of the present invention, which first housing is used in retrofiting a reverse osmosis system as was previously seen in FIG. 1, and which first housing was previously seen in FIG. 2b.
Figure 10:
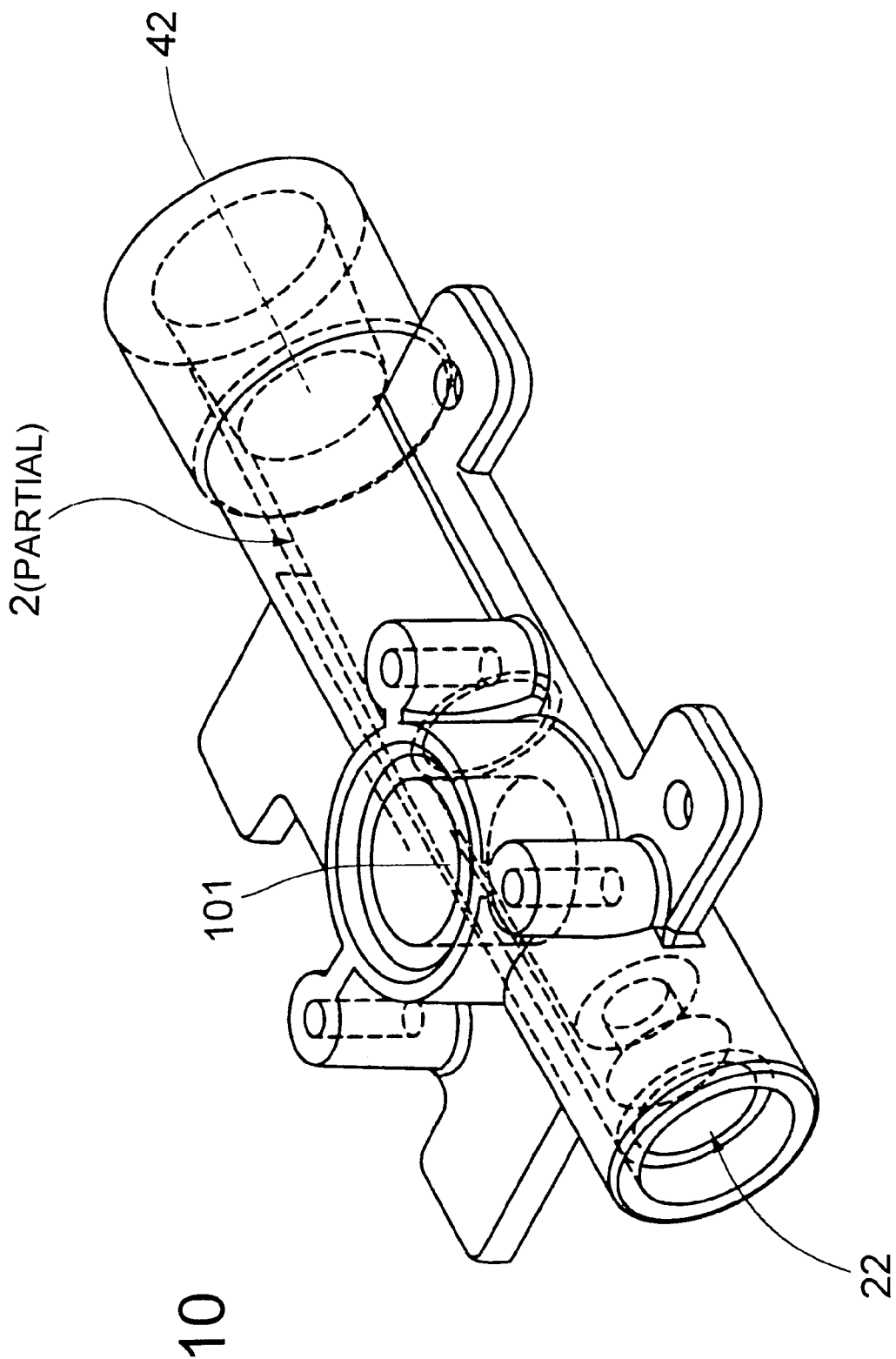
FIG. 10 is a pictorial view of a preferred second housing containing and defining a flow channel, which second housing is part of the preferred second subassembly of the present invention, which second housing is used in retrofiting a reverse osmosis system as was previously seen in FIG. 1, and which second housing was previously seen in FIG. 2b.
Figure 11:
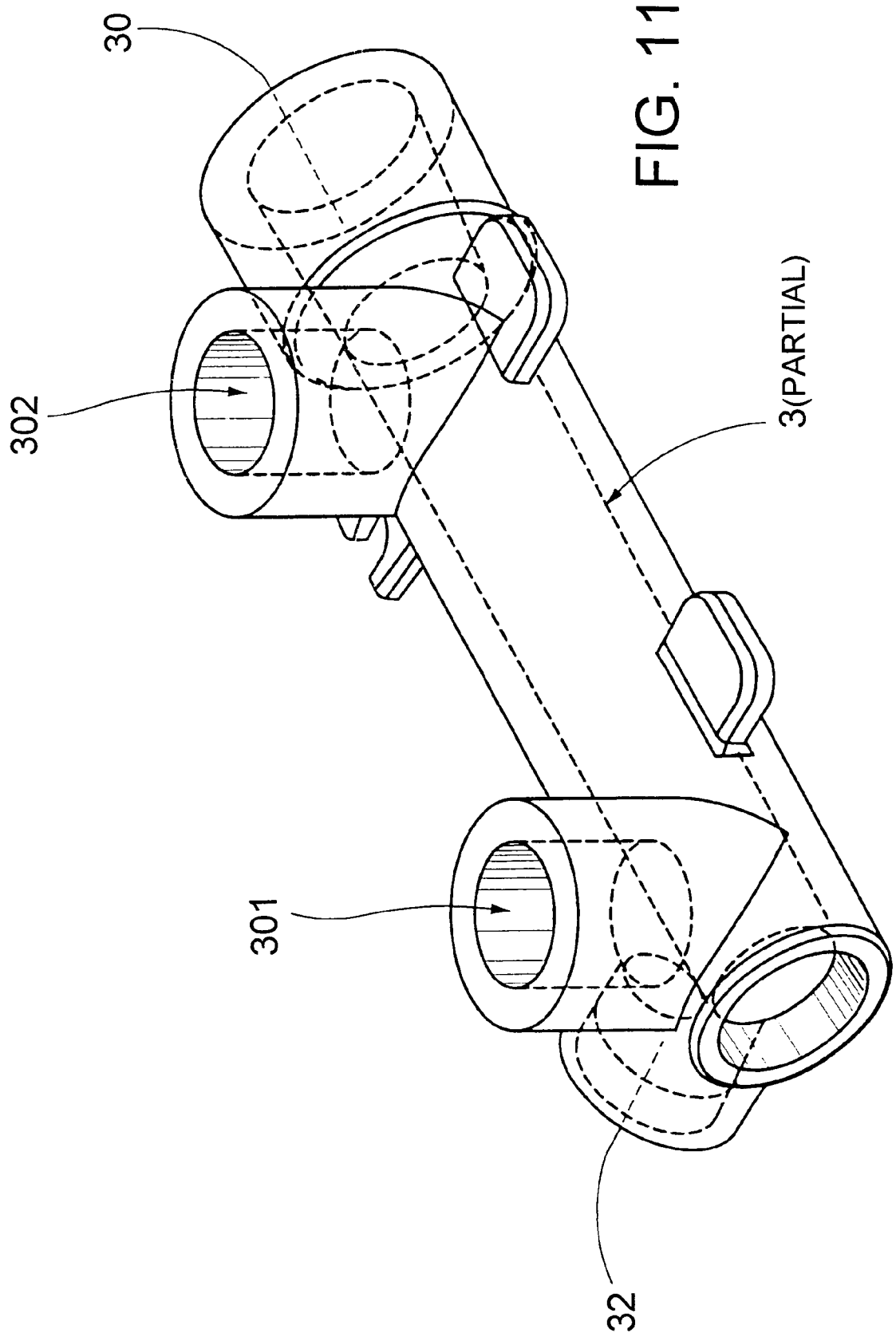
FIG. 11 is a pictorial view of a preferred third housing containing and defining a flow channel, which third housing is part of the preferred third subassembly of the present invention, which third housing is used in retrofiting a reverse osmosis system as was previously seen in FIG. 1, and which third housing was previously seen in FIG. 2b.

Pictorial views of the preferred first, second and third housings—each containing and defining a flow channel and each part of a respective preferred subassembly of the present invention —are shown again in FIGS. 9–11. Each housing is used in retrofiting the reverse osmosis system as was previously seen in FIG. 1. (The collective housings 1–3 were previously seen in FIG. 2b.)

Each of the housings 1–3 is preferably molded, normally from plastic. The flow channel within each is shown as a dotted line. In the housing 1 of FIG. 9, ports 12 and 10 are preferably press fit. The element 101 is a press fit plug. The cavity 102 fits the gauge (shown in FIG. 1). The cavity 103 fits the electronic cutoff valve 13 (also shown in FIG. 1).

Likewise, in the housing 2 shown in FIG. 10, both the check valve 24 and the tank shut-off valve 23 flow connect to a cavity (the switches being stacked one atop the other). The ports 42 and 22 are again preferably press fit.

Finally, in the housing 3 shown in FIG. 11, the gauge 31 flow connects to and through the cavity 302 while the gauge 35 flow connects to and through the cavity 301. The ports 32 and 30 are yet again preferably press fit.

Although specific embodiments of the invention have been described with reference to the drawings, it should be understood that such embodiments are by way of example only and are merely illustrative of but a small number of the many possible specific embodiments to which the principles of the invention may be applied. Various changes and modifications obvious to one skilled in the art to which the invention pertains are deemed to be within the spirit, scope and contemplation of the invention as further defined in the appended claims.

In accordance with the preceding explanation, variations and adaptations of the sub-assemblies, and their exact function and packaging, in accordance with the present invention will suggest themselves to a practitioner of the mechanical and fluid flow design arts. For example, adding one or more components to the preferred sub-assembly or assembly, or substituting various types of valves and gauges for the those types implied in the drawings, or listed in the list of preferred parts, does not erode the essential essence of the present invention, as expressed within the following claims, as a new and useful basis of organizing, partitioning and packaging a zero-waste RO system both so that such a system may be realized by retrofit of an existing non-zero-waste RO system, and may be newly constructed at a beneficially higher degree of integration than heretofore.

In accordance with these and other possible variations and adaptations of the present invention, the scope of the invention should be determined in accordance with the following claims, only, and not solely in accordance with that embodiment within which the invention has been taught.

What is claimed is:

1. In a reverse osmosis system flowing water between an inlet port receiving pressurized unpurified water and both a first outlet port flowing purified water and a second outlet port flowing waste water, a monolithic assembly usable in a portion of the reverse osmosis system between the inlet port and a reverse osmosis membrane vessel, the assembly comprising:

a monolithic molded body defining a fluid flow channel between (1) an input portal suitably connected externally to the body to a pressurized flow of unpurified water and (2) an output portal suitably connected externally to the body to a reverse osmosis membrane vessel;

a first portal, molded within the body, communicating fluid pressure from the fluid flow channel within the body to a pressure switch external to the body; and a second portal, molded within the body downstream of the first portal, communicating fluid pressure from the fluid flow channel within the body to a pressure gauge external to the body;

wherein the body fluidly communicates a pressurized flow of unpurified water to a reverse osmosis membrane vessel while communicating fluid flow pressure to both an external pressure switch and an external pressure gauge.

2. The assembly according to claim 1, wherein the first portal communicates fluid pressure from the fluid flow channel within the body to an electronic pressure switch that serves to control a valve for cutting off fluid flow to the assembly and to the reverse osmosis system, for as long as a predetermined pressure is exceeded.

3. The assembly according to claim 1, wherein plumbed connections to the input portal and to the output portal are press fitted.

4. The assembly according to claim 1, wherein plumbed connections to the input portal and to the output portal are threaded and screwed.

5. The assembly according to claim 1 further comprising:

at least one tab by which the assembly is suitably, physically mounted to a backboard.

6. The assembly according to claim 1, wherein said reverse osmosis system is a zero-waste reverse osmosis system.

* * * * *